(12) United States Patent
Swamy et al.

(10) Patent No.: US 10,725,827 B2
(45) Date of Patent: Jul. 28, 2020

(54) ARTIFICIAL INTELLIGENCE BASED VIRTUAL AUTOMATED ASSISTANCE

(71) Applicant: ACCENTURE GLOBAL SOLUTIONS LIMITED, Dublin (IE)

(72) Inventors: Siddesha Swamy, Bangalore (IN);
Kumar Viswanathan, Bangalore (IN);
Nirav Sampat, Mumbai (IN); Prakash Ghatage, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 293 days.

(21) Appl. No.: 16/008,761

(22) Filed: Jun. 14, 2018

(65) Prior Publication Data
US 2019/0384640 A1 Dec. 19, 2019

(51) Int. Cl.
| | |
|---|---|
| *G06F 9/50* | (2006.01) |
| *G06F 9/48* | (2006.01) |
| *G06F 9/451* | (2018.01) |
| *G06F 3/0486* | (2013.01) |
| *G06N 20/00* | (2019.01) |
| *G06F 16/901* | (2019.01) |

(52) U.S. Cl.
CPC .......... *G06F 9/5038* (2013.01); *G06F 3/0486* (2013.01); *G06F 9/453* (2018.02); *G06F 9/4843* (2013.01); *G06F 16/901* (2019.01); *G06N 20/00* (2019.01)

(58) Field of Classification Search
CPC ..................................................... G06F 9/5038
See application file for complete search history.

(56) References Cited

U.S. PATENT DOCUMENTS

| | | | |
|---|---|---|---|
| 2017/0337518 A1* | 11/2017 | Fang | G06N 20/00 |
| 2018/0130024 A1* | 5/2018 | Fang | G06N 20/00 |
| 2019/0362222 A1* | 11/2019 | Chen | G06N 3/0481 |
| 2020/0005170 A1* | 1/2020 | Priel | G06N 5/04 |

* cited by examiner

*Primary Examiner* — Sisley N Kim
(74) *Attorney, Agent, or Firm* — Mannava & Kang P.C.

(57) ABSTRACT

An Artificial Intelligence (AI) based virtual automated assistance system provides services pertaining to component processes of a task that is to be automatically executed. The virtual automated assistance system includes a pipeline studio that enables generating the services. Historical data pertaining to a service is accessed for training and validating various ML models. The ML models are scored and a selected ML model is registered as a service on the virtual automated assistance system. The services thus registered are represented as process blocks within the pipeline studio wherein the process blocks pertaining to the component processes of the task are arranged in order to form a pipeline. The pipeline thus constructed enables automatic execution of the task by receiving and processing a request pertaining to the task via the services that form the pipeline.

20 Claims, 16 Drawing Sheets

LUIS MODEL REGISTRATION → REF62

GEOGRAPHY EXTRACTION

HTTPS://WESTUS.API.COGNITIVE.MICROSOFT.COM/LUIS/V2.0/APPS/7E835BFF-6BA0-4AFF-9821-535EEB1F4557?SUBSCRIPTION-KEY=AAD85299FB4447EC95908856732193588&VERBOSE=TRUE&TIMEZONEOFFSET=0&Q=

I WILL BE VISTING NEW DELHI FROM 29-JUNE TO 30-JUNE COULD YOU BOOK ROOM WITHIN MY BUDGET OF 200$

PIPELINE CREATION FOR INFORMATION EXTRACTION

--ORIGINAL MESSAGE--
FROM: GIRISH.MANI@ACCENTURE.COM
DATE: 1/5/2015 7:29.02PM
TO : TECHNOLOGY.SUPPORT@ACCENTURE.COM
SUBJECT: HOTEL BOOKING

HI,

I WILL BE VISITING NEW DELHI FROM 20-JUNE TO 22-JUNE COULD YOU BOOK ROOM WITHIN MY BUDGET OF 200$

THANKS IN ADVANCE,
GIRISH MANI

*FIG. 11A*

ARTIFICIAL INTELLIGENCE BASED VIRTUAL AUTOMATED ASSISTANCE

BACKGROUND

Modern day organizational environments are heavily dependent on computing and communication systems for execution of their tasks. An organization's workforce may be primarily interacting with its computing systems in carrying out its various duties. The increasing use of computing systems to execute various complex tasks has given rise to Artificial Intelligence (AI) technologies wherein smart machines capable of independent decision making are developed. Various reasons such as development of computational resources capable of processing large amount of data, the explosive growth of data that is available for processing (Big Data), the focus on specific tasks or problems and development of machines capable of receiving feedback and improving thereon are a few of the reasons for the rise of AI technologies in our everyday life.

The research associated with AI is highly technical and specialized. Some of the tasks involved in developing machines with AI can include programming computers to acquire traits such as knowledge, reasoning, problem solving, perception, planning and ability to manipulate and move objects. Machine learning (ML) and natural language processing (NLP) are important parts of AI. ML involves mathematical analysis of various ML algorithms and their performances. Teaching machines human skills such as reasoning, problem solving and decision making can be a difficult and tedious task requiring a highly trained workforce.

BRIEF DESCRIPTION OF DRAWINGS

Features of the present disclosure are illustrated by way of examples shown in the following figures. In the following figures, like numerals indicate like elements, in which:

FIG. 7A shows a new service user interface (UI) in accordance with some examples disclosed herein.

FIG. 7B shows a user interface that displays scores obtained by the various trained ML models in accordance with examples described herein.

FIGS. 11A and 11B depict a use case scenario wherein a task request is received via an email channel in accordance with examples disclosed herein.

DETAILED DESCRIPTION

Figure 1:
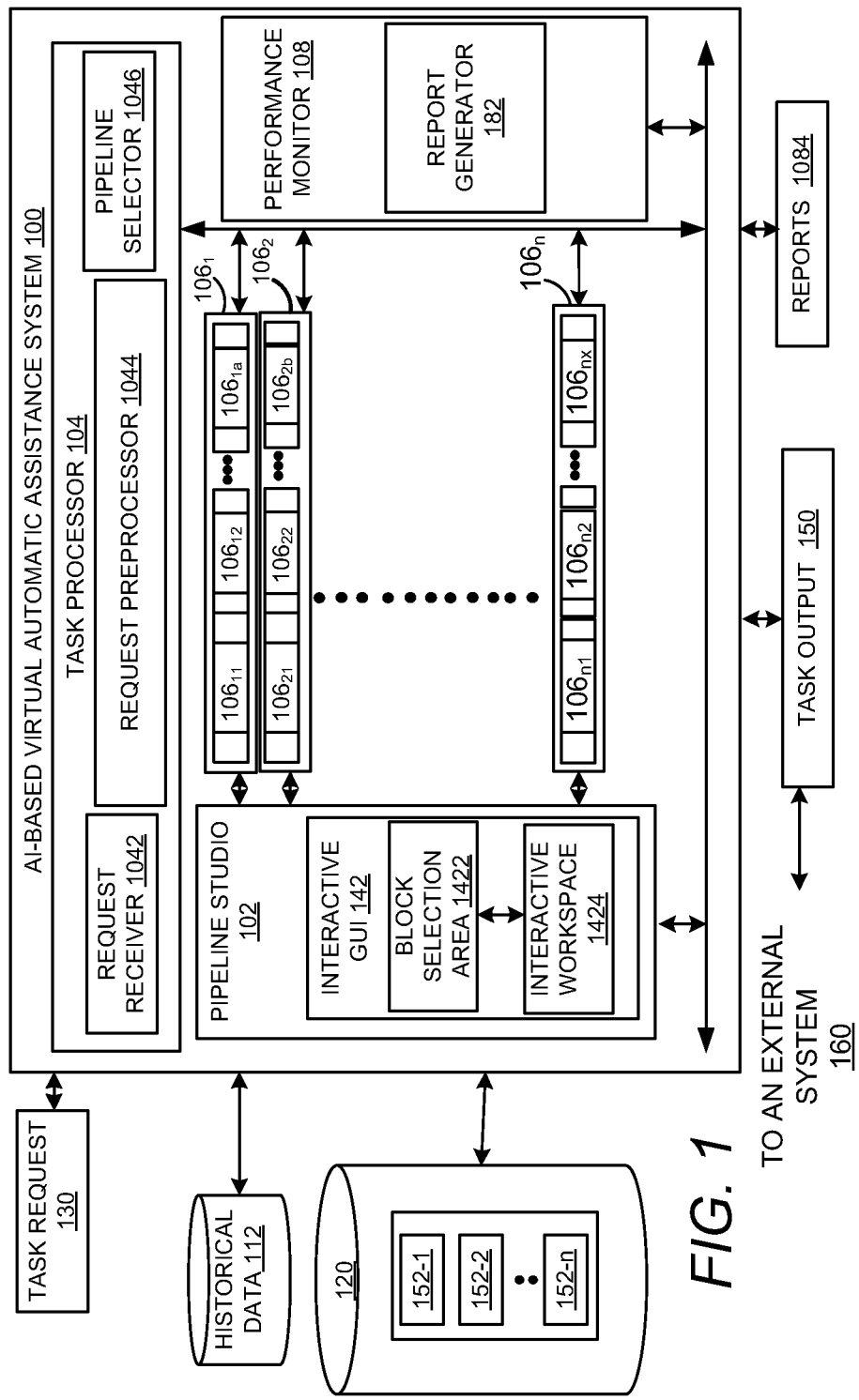
FIG. 1 is a block diagram that shows an AI-based virtual automated assistance system in accordance with examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

The AI-based virtual automated assistance system disclosed herein provides for an intelligent software framework to support AI led automation agenda for software engineering helping in automation and augmentation of various services and operations. In an example, the virtual automated assistance system supports automation of knowledge work such as application delivery and management, testing, document oriented processes etc. The framework enables providing services such as but not limited to, automated ingestion of textual input, natural language processing (NLP), select capabilities of machine learning (ML), creation, maintenance and execution of pipelines that enable orchestrated execution of NLP and ML capabilities in a pipelined manner, creation and integration of knowledge ontologies and information or entity extraction.

The AI based virtual automated assistance system includes platforms that enable knowledge work automation. When a task is to be automatically executed, the task is analyzed to identify various component processes. A component process can include a process or a function that forms one of the plurality of processes that are to be executed in order to complete the task. The output from a component process can either be directly presented to the user or the output of a component process can be fed to the input of another process for the execution of downstream functions of the task. The virtual automated assistance system provides for creation and/or registration of services that enable the automatic execution of the component processes. Therefore, when the task is considered as a series of component processes, the virtual automated assistance system provides for a pipeline that enables an orderly execution of the various services corresponding to the component processes thereby enabling the automatic execution of the task. The automatic execution of the task therefore provides for minimal or even no human involvement from receiving the task request to fulfilling an intent or task associated with the task request.

The virtual automated assistance system includes a pipeline studio that enables the creation and/or registration of services that enable automatic execution of tasks by different computing systems. The pipeline studio includes an interactive GUI that provides access to various existing services in addition to enabling building new services. The services accessible via the virtual automated assistance system can include those services that were developed on the virtual automated assistance system. Additionally, the virtual automated assistance system also provides for a plug-and-play architecture wherein third party services can be registered and accessed on the virtual automated assistance system thereby speeding up the automatic task execution instead of requiring the users to recreate the service on the virtual automated assistance system.

The various services accessible on the virtual automated assistance system are represented as user-selectable process blocks on the interactive GUI based on the user authentication so that specific task owners or clients have access to particular services and may not access the services and/or pipelines of other task owners on the virtual automated assistance system. Intelligent ML tools provide the ability to build the machine learning capability for use cases from different domains. Clients form different domains can be on boarded to the virtual automated assistance system to train their functionality in to the machine provided the training dataset defines the historic data and its expected results. If the services pertaining to the component processes of a pipeline are registered on the virtual automated assistance system, the user can proceed to build the pipeline for the automatic execution of the task. If one or more services need to be created anew, the historical data pertaining to the services to be created is provided to the virtual automated assistance system. The historical data can include data logs that were generated during prior execution (e.g., manual) of the service or the component process. The historical data can thus include the one or more inputs provided to the component process and the one or more outputs provided by the component process. In an example, the inputs and the outputs of the component process can be expressly labelled for supervised learning. The historical data can be used to train one or more ML models. In real time, diva tool can be used to predict the results based on the historic machine learned data for a given client functionality. In an example, the user can specify a ML model for training. Intelligent ML uses several machine-learning techniques to automatically build and train a learning algorithm that can recognize relevant information from textual data, including for example a task request.

In case no ML model is explicitly specified by the user, the virtual automated assistance system can proceed to train multiple ML models on the historic data. The multiple ML models thus trained can be validated and scored. In an example the multiple ML models and their respective scores can be presented to the user and the user selected model can be registered to the virtual automated assistance system as a service. In an example, the virtual automated assistance system can be configured to automatically select a highest scoring ML model or the ML model that provides a most accurate prediction for registering as a service.

The ML models or services corresponding to the component processes of the task registered on the virtual automated assistance system are represented as respective process blocks. A process block can be a user interface element that enables the user to manipulate the service via providing visual representation of the service along with an ability to manipulate the inputs and outputs of the service. The user can access the process blocks representing the services from a block selection area of the interactive GUI. The user therefore selects and drops onto an interactive work space the various process blocks representing services that correspond to the component processes of the task. The process blocks are arranged serially in order of execution of the component processes and the inputs of the process blocks within the series are connected to outputs of the preceding process blocks in the series. Alternately, the outputs of the process blocks can be connected to the inputs of the succeeding process blocks in the series. A pipeline of serially-connected process blocks is thus formed and represents the task. The interactive GUI also includes controls such as play/execute buttons so that upon user activation of the controls, the pipeline is executed and the task is automatically executed during a testing phase.

When a task request is received, the task request can be pre-processed to extract information such as entities and entity attribute values related to the task. In an example, a pipeline to execute the task can be selected based on a channel via which the task request was received. For example, a specified pipeline can be configured to automatically handle input or task requests received at particular email inbox or a particular chat window. The entities and entity attribute values are provided as inputs to the pipeline which automatically proceeds to execute the task. The results from the automatic execution of the task can be provided to the user via one or more communication channels configured for the user within the virtual automated assistance system.

The virtual automated assistance system as described herein provides for an improved service automation system wherein services can be created on an ad-hoc basis provided the corresponding historical data is available. Building and optimizing ML algorithms normally requires a detailed understanding of the underlying math and code, as well as extensive practice tweaking the parameters of algorithms to optimize the algorithms for use in specific processes. The virtual automated assistance system does not require a user generating and registering the service to have knowledge of the various ML models such as parameter values or configuration details and the like. When the user uploads the historical data to the virtual automated assistance system a plurality of ML models are trained and a selected ML model of the trained ML models is registered as a service. A simple drag-and-drop of the process blocks enables generating a pipeline that automates a complex task including many component processes. Therefore, the development of automation processes is speeded up which in turn enables development in other external systems. Examples are disclosed wherein adoption of the virtual automated assistance system in a hotel reservation system or an invoice processing system enables these systems to handle task requests with little or no human intervention.

FIG. 1 is a block diagram that shows the AI-based virtual automated assistance system 100 in accordance with examples disclosed herein. The virtual automated assistance system 100 includes a pipeline studio 102 which is configured as a user interface based application that enables generating and accessing the various services published on the virtual automated assistance system 100 for building one or more pipelines 106$_1$, 106$_2$ ... 106$_n$ (wherein n is a natural number). Each of the pipelines 106$_1$ ... 106$_n$ is configured to automatically execute a corresponding task for a task owner within a task domain. In an example the virtual automated assistance system 100 can host tasks for a number of task owners or clients within various domains so that each domain can have multiple task owners. Moreover, each task owner can be associated with a set of pipelines within a secure environment so that only authorized users are able to access the pipelines of the task owner for editing or usage purposes. Therefore, it can be appreciated that different pipelines may be created for the same tasks for different task owners in their respective secure environments. For the purposes of simplicity it is assumed that the pipelines $106_1 \ldots 106_n$ belong to a single task owner and are hosted on the virtual automated assistance system 100 in a secure environment. The virtual automated assistance system 100 can host multiple secure environments for different task owners.

A task that is to be executed by the virtual automated assistance system 100 can be further made up of component processes. For example, in a ticket assigning platform, the task can include automatic assignment of a customer email to a particular group or a customer representative to handle the issue. The task of assigning the customer representative to an email includes without limitation at least four component processes such as, pre-processing the customer email using NLP techniques to identify the task owner, entities, attribute values and intent, classifying the issue or intent, identifying a group to handle the issue or a group related to the intent and assigning/transmitting the customer email to the classified group. Accordingly, each of the pipelines $106_1 \ldots 106_n$ can be made up of a plurality of process blocks wherein one or more of the process blocks pertain to a component process. Furthermore, each process block represents a respective service published to the virtual automated assistance system 100. The services are accessible to the task owners within the virtual automated assistance system 100 for building pipelines within their respective secure environments. Accordingly, pipeline 1061 includes process blocks $106_{11}, 106_{12} \ldots 106_{1a}$, while pipeline $106_2$ includes process blocks $106_{21}, 106_{22} \ldots 106_{2b}$, and similarly $106_n$ is constructed from process blocks $106_{n1}, 106_{n2} \ldots 106_{nx}$, wherein a, b and x are also natural numbers which may or may not be equal to each other. The services that are represented by the process blocks include selected ML models trained to execute certain processes. When a task is identified for automatic execution by the virtual automated assistance system 100, the task is broken down into component processes. One or more of the various services available on the virtual automated assistance system 100 can be selected to enable automatic execution of each component process. Therefore, while a one-to-one correspondence between the component processes and the process blocks/services is maintained for simplicity, it can be appreciated that this is not necessary and that more than one service or more than one process block can be used sequentially for executing a single component process.

In an example, the services available in the virtual automated assistance system 100 can include those services which are native to the virtual automated assistance system 100 so that the services are created and made available by the virtual automated assistance system 100. Additionally, the virtual automated assistance system 100 can also make available third party services for use in constructing the pipelines $106_1 \ldots 106_n$. Third party services can include, for example, ML-based automatic task execution services which are created and made available either freely or at a cost on public resources like the internet. Examples can include without limitation cloud-based services such as those available with MICROSOFT AZURE, AWS, IBM WATSON and the like. The process blocks representing the third-party services can be available for selection in building the pipelines $106_1 \ldots 106_n$ as detailed further herein.

In order to create and make available a service associated with a component process on the virtual automated assistance system 100, historical data 112 associated with the service is provided or made accessible to the pipeline studio 102. The historical data 112 includes logs collected during prior runs of the component process. The prior runs could include manual execution of the component process which requires user involvement. The historical data 112 include entities, entity attribute values and other parameter values that are input to the component process and values that are output by the component process upon completion. The historical data 112 includes big data that can be stored at a remote location. Portions of the historical data can be stored in a non-transitory processor-readable storage medium which is local to a machine that executes the virtual automated assistance system 100 such as the data storage 120. For example, data can be collected during the automatic runs or automatic executions of the various tasks by the pipelines $106_1 \ldots 106_n$ can be initially stored locally and uploaded to the remote big-data storage at an appropriate time. In either case, the historical data 112 can be accessed as one or more of training data and testing data by the virtual automated assistance system 100. The historical data 112 can be received as structured data in various formats such as spreadsheets, comma separated value (csv) files, relational database files and the like. If unstructured data is to be accessed, then the unstructured data can be converted to structured data prior to being accessed by the pipeline studio 102.

The pipeline studio 102 trains one or more ML models 152-1 . . . 152-n for execution of the component process as detailed herein. A trained ML model is published to the virtual automated assistance system 100 and is available for use as a service represented by a user-selectable process block on one of the GUIs associated with the virtual automated assistance system 100. Different GUIs enabling user interactions for various purposes are put forth by the virtual automated assistance system 100. One of the GUIs is associated with the pipeline studio 102 and includes an interactive GUI 142 which further includes at least a block selection area 1422 that permits selection of process blocks $106_{11}$ . . . etc. to build the pipelines $106_1 \ldots 106_n$. The interactive GUI 142 also includes an interactive workspace 1424 coupled to the block selection area 1422 in which the selected process blocks for constructing a given pipeline such as, the pipeline $106_1$, are arranged by a user in a sequential order corresponding to the order in which the component processes of the task are to be executed during the automatic execution of the task. In an example, various user interfaces that form parts of the interactive GUI 142 enable accessing knowledge ontologies in order to aid the user in creating and registering the services.

When construction of the one or more pipelines $106_1 \ldots 106_n$ is completed, automatic execution of the tasks for which the pipelines are built can be commenced with receipt of a task request 130 by the virtual automated assistance system 100. The task request 130 can be received by the request receiver 1042 included in a task processor 104 via various modalities including but not limited to, email, chat applications, small messaging service (SMS), voice mail and the like. If the task request 130 is received as a voice or video input, then a speech-to-text application can be employed to generate a textual input for processing by the virtual automated assistance system 100. The textual content from the task request 130 can include one or more of a task owner, a domain, entities, entity attribute values and user intents which can be indicative of one or more of the task that the user desires to execute and the output that the user is expecting from the task by issuing the task request 130. The request pre-processor 1044 processes the request to extract the information therein including the entities, the entity attribute values, user intent(s), the task owner and the like. Based on the extracted information, the pipeline selector 1046 selects at least one of the pipelines $106_1 \ldots 106_n$ for executing the task specified in the task request 130. The task output 150 from the automatically executed task can take many forms. The task output 150 can include textual output such as a response to a question posed in the task request 130. The task output 150 can include changes made to other external computer systems 160 such as but not limited to, ticketing platforms that resolve technical glitches in computer systems, hotel or travel reservation systems, billing enquiries to name a few. Details of the different types of task requests and the various forms that the task output 150 can take are illustrated in some example use case scenarios discussed infra.

The virtual automated assistance system 100 also includes a performance monitor 108 which monitors the performance of the various pipelines across the different domains. The performance monitor 108 also includes a report generator 182 which generates reports 1084 that convey the performance statistics of the virtual automated assistance system 100. For example, the virtual automated assistance system 100 can determine via explicit questioning of the users posing the task requests or implicitly via various factors the efficiency improvements afforded by the virtual automated assistance system 100. The factors can include but are not limited to, the number of tasks successfully handled in a completely automatic manner, the number of tasks which were flagged for human intervention, the number of tasks which raised errors and the like. Applications of various filters such as the domains, the task owners, the various modalities or platforms such as emails, chat groups etc. used and the like can be employed for obtaining specific performance information of the virtual automated assistance system 100. Platforms such as MICROSOFT Azure, SCIKIT and technologies such as Python, deep learning and web-based scripts can be employed to build the various elements of the virtual automated assistance system 100.

Figure 2:
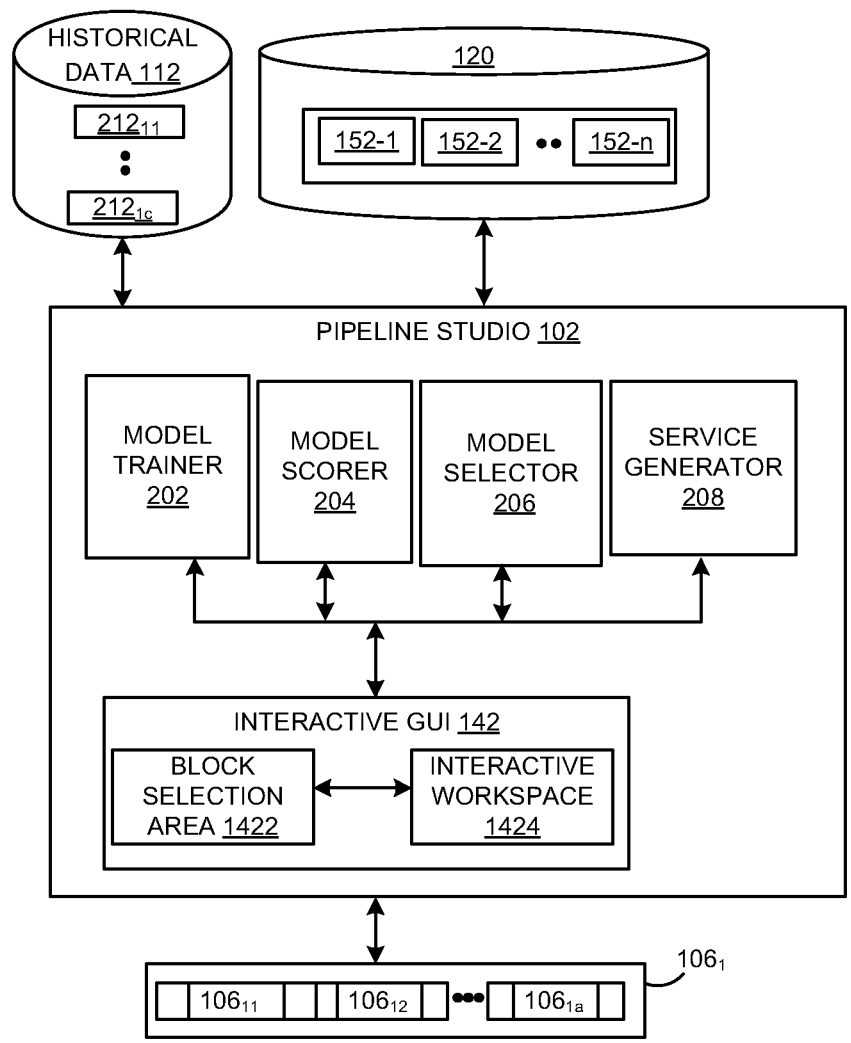
FIG. 2 shows a block diagram of a pipeline studio in accordance with examples disclosed herein.

FIG. 2 shows a block diagram of the pipeline studio 102 in accordance with examples disclosed herein. The pipeline studio 102 includes a models trainer 202, a model scorer 204, a model selector 206 and a service generator 208. As mentioned above, the various component processes are executed by one or more of the services which are represented by the process blocks $106_{11}, 106_{12} \ldots 106_{1a}$ and other similar process blocks from the other pipelines. When a user initially selects a task for automatic execution, the various component processes within the task are identified by the user along with determining if the services corresponding to the various component processes or particular models suitable for functions of the component processes are published or available on the virtual automated assistance system 100. Accordingly, certain services can be referred to as model-specific services for which particular models are specified by the user. The user can select from the many ML models $152_1 \ldots 152_n$ accessible on the virtual automated assistance system 100. The ML models $152_1 \ldots 152_n$ can include but are not limited to Naïve Bayes model, Random Forest model, KNN model and the like. The user-selected ML model can be received by the model selector 206 and trained on the historical data 112 by the model trainer 202. The historical data 112 can include respective data subsets $212_1 \ldots 212_c$ which pertain to each of the services that are to be generated. As mentioned earlier, the data subsets $212_1 \ldots 212_c$ are generated during prior executions of the corresponding component processes. The user-selected ML model trained on one of the data subsets $212_{11} \ldots 212_{1c}$ is published on the virtual automated assistance system 100 by the service generator 208 for use in constructing the pipeline $106_1$. In an example, the service generator 208 can place the model in a table corresponding to the trained models and make available, a universal resource locator (URL) that enables access to the trained model for building the pipelines.

For each of the services that remain without a user-selected ML model, the model trainer 202 trains each of the ML models 152-1 . . . 152-n on one of the data sets $212_1 \ldots 212_c$ corresponding to that component process. Thus, a plurality of ML models trained on the corresponding data set are generated by the model trainer 202. Each of the plurality of trained models are scored using the model scorer 204. In order to score the ML models, a portion of the historical data 112 can be held back from the training phase or reserved for use as test data. The outcomes or predictions produced by each of the trained ML models can be compared to the outcomes in the historical data 112 to determine the accuracy of the predictions produced by each of the trained ML models. The scores enable determining if the predictions from the trained ML models are accurate and if any errors exist. Based on the scores, the model selector 206 can be configured to automatically select the highest scoring ML model for publishing as a service on the virtual automated assistance system 100. In an example, the model scores can be displayed to the user via a GUI who will then select one of the trained and scored ML models to be available as a service on the virtual automated assistance system 100.

When a service associated with the component process becomes available on the virtual automated assistance system 100, it is represented by a user-selectable process block, such as the process block $106_{11}$, within a block selection area 1422 of the interactive GUI 142. Similarly each of the component processes or services can be represented by the respective process blocks within the block selection area 1422. The user can arrange the process blocks on the interactive workspace 1424 in the order to execution of the corresponding component processes. The output(s) of the first process block is connected to one or more inputs of the second process block while the output(s) of the second process block is connected to one or more inputs of the third process block and so on. The pipeline $106_1$ corresponding to a particular task owner within a particular domain and representing the task to be automatically executed is thus constructed and stored within the virtual automated assistance system 100. Other pipelines can be similarly generated, however it may be noted that while some process blocks correspond to services generated on the virtual automated assistance system 100 other process blocks can represent services from third-party providers which are accessible via the virtual automated assistance system 100.

Figure 3:
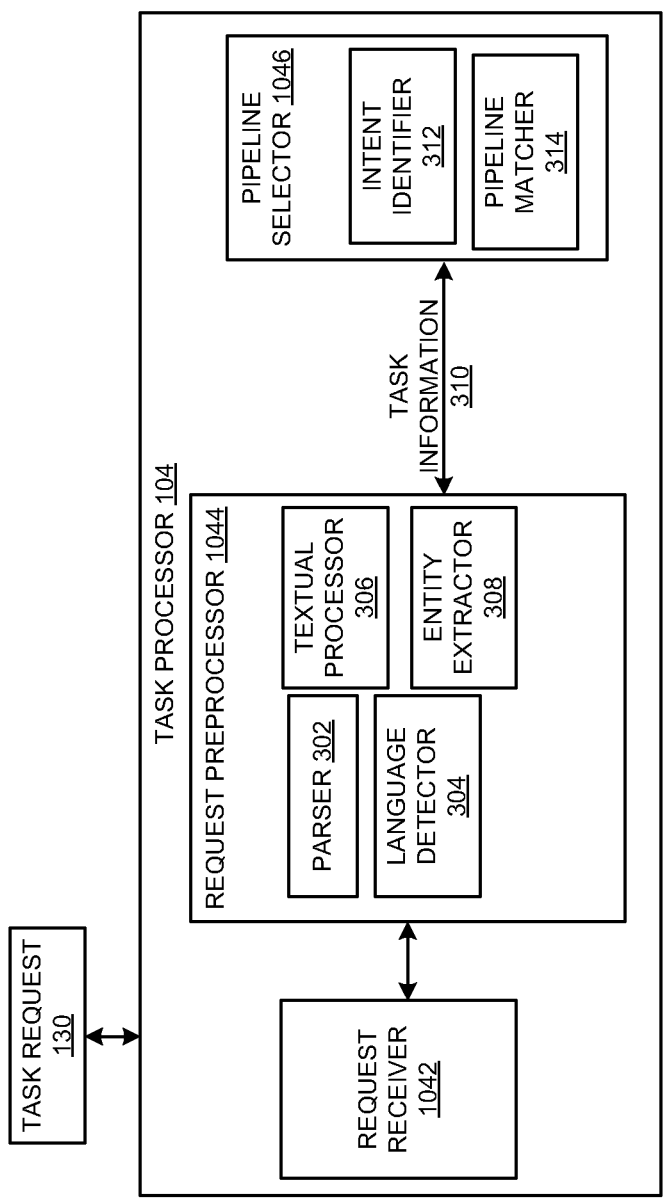
FIG. 3 is a block diagram of a task processor in accordance with examples disclosed herein.

FIG. 3 is a block diagram of the task processor 104 in accordance with examples disclosed herein. Once the pipeline for the automatic execution of a task is constructed, the virtual automated assistance system 100 begins to receive tasks requests which are automatically processed by the pipeline and the output is produced with little or no manual intervention. Use cases illustrating the automatic task executions are detailed herein. Upon receiving the task request 130 by the request receiver 1042, the task request 130 is processed by the request pre-processor 1044. The request pre-processor 1044 further includes a parser 302 for parsing the task request 130 or the text associated therewith and producing tokens. In addition, the request pre-processor can further include a language detector 304 that detects various languages. In an example, the language detector 304 can include ML algorithms to read through different textual inputs and identify the languages used. Third party services such as MICROSOFT LUIS can be used for the language detector 304 in an example. Accordingly, the task request 130 can be received in multiple languages. The request pre-processor 1044 can further include textual processor 306 for executing language-based functions such as translations, spell check, parts of speech (POS) tagging and the like. The output from the textual processor 306 can be accessed by an entity extractor 308. The entity extractor 308 can include trained ML models (not shown) employing named entity recognition (NER) techniques. Therefore, having received a textual stream from the textual processor 306, the entity extractor 308 can determine the items or tokens from the textual stream that map to proper entities such as but not limited to people, money, places, date, time, particular phrases or words. The entities can also include the task owner, the domain and task-specific data such as particular names, places, dates and the like which is output as the task information 310 by the request pre-processor 1044. By the way of illustration and not limitation, the task information 310 can be output as an entity list in Java Script Object Notation (JSON) or csv formats.

The task information 310 is employed by a pipeline selector 1046 for identifying the intent and using the intent to select an appropriate pipeline for the automatic execution of the task. An intent identifier 312 feeds the task information 310 to AI models such as but not limited to, support vector machines (SVMs) or conditional random fields (CRFs) for intent identification. In an example, a scored list of intents can be generated and an intent with the highest score is identified as the intent corresponding to the task request 130. The identified intent can be used by the pipeline matcher 314 in selecting one of the pipelines $106_1 \ldots 106_n$ for the automatic execution of the task. As mentioned earlier, one or more of email, chat, instant messaging (IM), or other online collaboration tools that allow information exchange between users can be configured to receive the task request 130. In an example, a channel such as an email inbox or a chat window may be exclusively dedicated to a pipeline so that task requests received on that channel are automatically directed to that particular pipeline.

Figure 4:
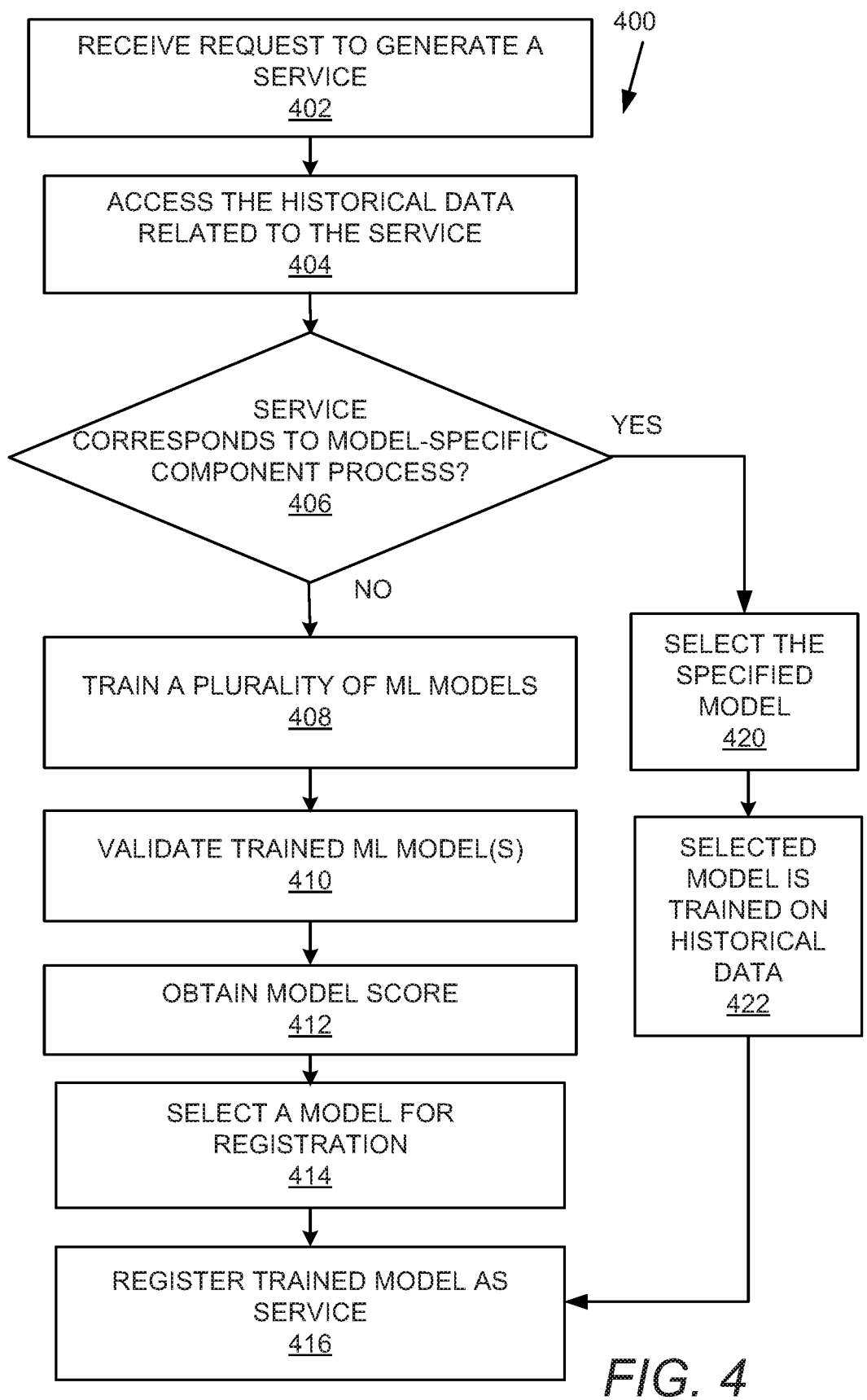
FIG. 4 is a flowchart that details a method of providing a service on the AI-based virtual automated assistance system accordance with examples disclosed herein.

FIG. 4 is a flowchart 400 that details a method of providing a service on the virtual automated assistance system 100 accordance with examples disclosed herein. When the virtual automated assistance system 100 is provisioned with the service, one or more ML algorithms are trained and registered on the virtual automated assistance system 100 so that the processes associated with the service are automated and can be executed with little or no manual intervention. One or more GUIs such as a service configuration GUI (the details of which will be discussed further herein) put forth by the virtual automated assistance system 100 enable a user to provide details regarding the service and/or the component process associated therewith. The method begins at 402 wherein a request to generate a service is received. In an example, the request to generate a service can be associated with a component process of a task for which a pipeline is to be generated on the virtual automated assistance system 100 wherein the pipeline is to be associated with a specific task owner and/or domain. The details of the task owner, the domain, the dedicated channels through which the messages are received are included in the request at 402. At 404, historical data 112 related to the service to be generated is accessed by the virtual automated assistance system 100. In an example, the service configuration screen enables the user to upload the historical data 112 for example, in a csv format wherein the user can further specify the columns pertaining to the features and the column(s) pertaining to the targets or output expected from the component process or service. The historical data 112 can include input parameter values and output results produced during prior manual executions of the service. Also user can specify the learn preprocessing utility to be used for the respective column. From the prior history of the tasks, usage encoder and vectorizer are considered as preprocessing utilities.

At 406, it is determined if the service corresponds to a model-specific component process wherein a ML model is specified by a user. If it is determined at 406 that a model is specified by the user, the method moves to 420 wherein the specified model is selected. In an example, the ML models or algorithms that are accessible for use by the virtual automated assistance system 100 can be specified within a registered algorithms table which may be stored for example, on a data storage 120. In an example, the user can select the particular algorithm via a drop-down box and the selected algorithm can be entered into the registered preprocessing algorithms table. At 422, the selected model or algorithm is trained on the historical data 112. The training can include various techniques such as but not limited to supervised learning, unsupervised learning and reinforcement learning. Classification type algorithms such as but not limited to support vector machines (SVMs), random forest, naïve bayes, K-nearest neighbor (KNN), dimensionality reduction algorithms, perceptron, gradient boosting, Ada Boost, ensemble methods and the like can employ supervised learning techniques. Algorithms such as clustering algorithm types can use unsupervised learning techniques while algorithms such as decision trees can use reinforcement learning techniques. Model files can be saved in trained models table with transaction Id as the name. There can be a unique entry in the model table each time when the training request is received by the model trainer 202. In an example, all the training configurations can be saved as a meta data in JSON format and new entries can be created in the training_transaction table which holds unique transaction Id, user Id, input csv dataset, JSON configuration, training mode, status etc. The selected trained ML model is registered as a service on the virtual automated assistance system 100 at 416.

If it is determined at 406 that the component process associated with the service to be generated does not correspond to a model-specific component process or if it is determined that no model has been specified in the user request received at 402, a plurality of models based on algorithms specified for example, within the registered algorithms table can be trained on the historical data 112 at 408. Multiple ML models are therefore trained on the historical data 112 at 408. Various training techniques and different ML models as detailed herein can be employed at step 408. The trained ML models can be validated using for example, test data at 410. A model score is obtained for each of the trained models at 412. The model scores can be estimated for example, based on a comparison e.g., similarity comparisons of the outputs or predictions generated by the various multiple ML models with the test data to the outputs already within the test data. One of the trained models is selected for registration as a service on the virtual automated assistance system 100 at 414. In an example, the model selector 206 can be configured to automatically select a model whose score indicates a closest match between the predictions and the outputs within the test data. In an example, the various models and their respective model scores can be displayed to a user and the user's selected model is received for registration as a service on the virtual automated assistance system 100 at 414. At 416, the model selected at 414 is registered as a service on the virtual automated assistance system 100. When selected by a user, the virtual automated assistance system 100 provides a further user interface to register the model. Regardless of whether automatically selected or user-selected, a model selected at 414 is moved from the trained models table to registered_models table whereby the registered models can now be employed for generating predictions or recommendations that are used in the automatic execution of the task. Various model details including the transaction id which may be used as a name for a unique model id for the selected model are also captured at 416.

Figure 5:
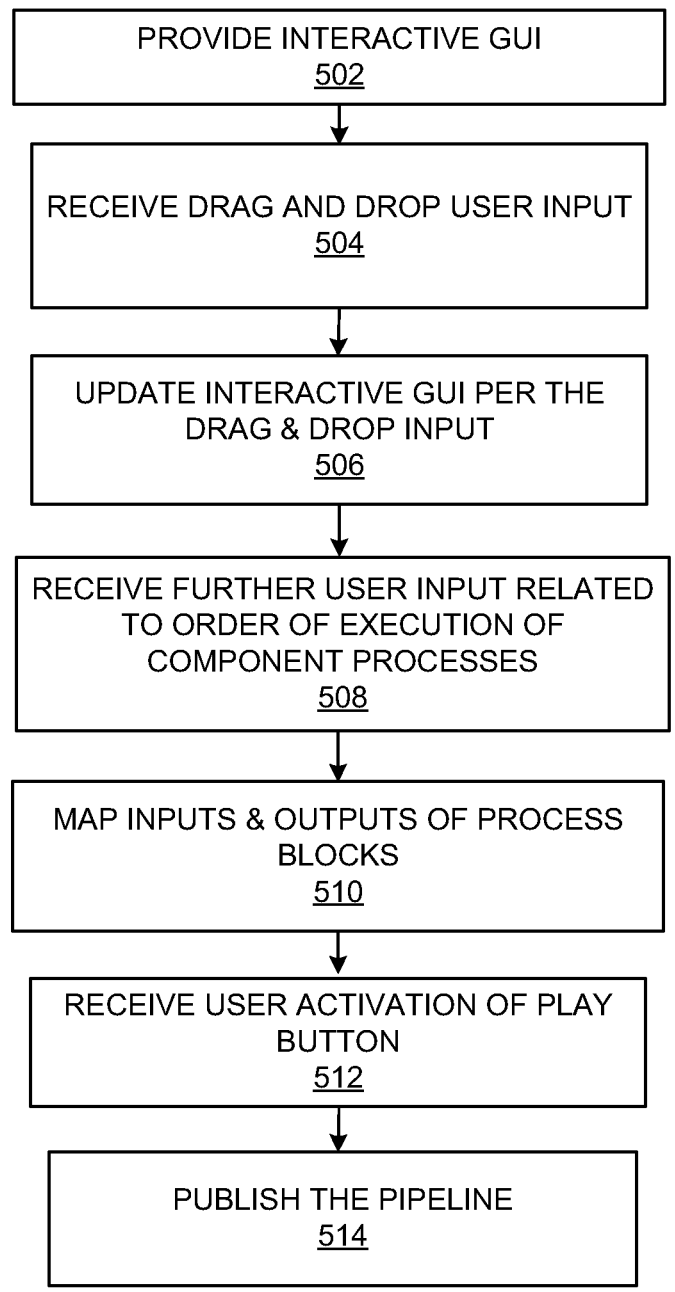
FIG. 5 is a flowchart that details a method of building a pipeline in accordance with examples described herein.

FIG. 5 is a flowchart that details a method of building a pipeline from in accordance with an example. The method begins at 502 wherein the interactive GUI 142 is provided to a user for building a pipeline that enables automatic execution of a task. The user analyzes the task and determines if the component processes that make up the task can be automatically executed via the services registered on the virtual automated assistance system 100. As the services registered on the virtual automated assistance system 100 are represented by respective process blocks, the user can search for specific process blocks or browse a list of services on the virtual automated assistance system 100 to identify if the services for the automatic execution of the component processes are registered on the virtual automated assistance system 100. The process blocks corresponding to the component processes are identified by the user and user input of dragging and dropping the process blocks from the block selection area 1422 to the interactive workspace 1424 is received at 504 and the interactive GUI 142 is updated per the user input at 506. At 508 further user input related to the order of execution of the component processes is received via the user's arrangement of the process blocks on the interactive workspace 1424. More particularly, the execution order is set via connecting the consecutive process blocks so that the output(s) of a particular process block in the series of process blocks are mapped to the input(s) of a succeeding process block in the series while the inputs of the process block are mapped to the output(s) of the preceding process blocks. The inputs and outputs of the process blocks are mapped accordingly at 510. Of course, it can be appreciated that the process blocks may also be arranged thus not only in one-to-one mapping but also in many-to-one mapping, many-to-many mapping, and one-to-many mapping. Once the process blocks are arranged as desired, the user can activate a play/execute control on the interactive GUI 142 during the testing or experimentation phase in order to determine if the pipeline produces output as expected. Accordingly at 512, user activation of the play/execute button on the interactive GUI 142 is received and the task represented by the pipeline is automatically executed. Upon verifying the working of the pipeline, the pipeline can be published to the virtual automated assistance system 100 at 514 for use by the task owner in the automatic execution of the task. In an example, the pipelines can be specific to the task owner or client within a particular domain so that only authorized users have access to edit or run the pipelines.

Figure 6:
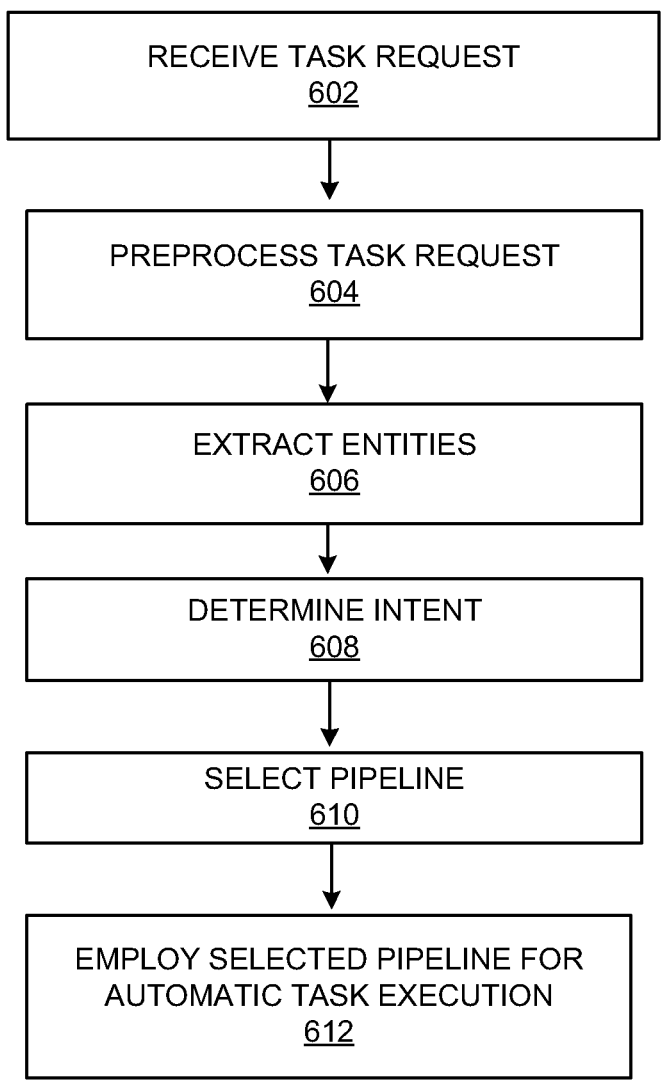
FIG. 6 is a flowchart that details a method of automatic execution of a task using a pipeline in accordance with examples disclosed herein.

FIG. 6 is a flowchart 600 that details a method of automatic execution of a task using a pipeline in accordance with examples disclosed herein. The method begins at 602 wherein the task request 130 for the automatic execution of the task is received. The trained models that form the pipeline can now be used to predict output for a given input from an interface such as an email interface or a chat interface or from an external application such as an Enterprise Resource Planning (ERP) system and the like. The virtual automated assistance system 100 offers prediction as a service and the service can be invoked with a trained model id and input data for the prediction to be output by a selected pipeline. The task request 130 is preprocessed at 604 via for example, a text preprocessing service which forms one of the component processes of the task. The output of the preprocessing service includes textual output as free text or in JSON or csv formats. The preprocessing service can include without limitation, special character cleanup (i.e., removal of special characters like #, ?, \\ etc.), removal of numbers, dates, email IDs, timestamps, disclaimers, stop words and the like. In addition, language processing tasks such as POS determination and tokenization can also be executed at 604. At 606, the entities in the task request 130 are extracted, for example, via calling an entity extraction service that is registered on the virtual automated assistance system 100. Therefore, the stream of text obtained at step 604 is analyzed by the entity extraction service to determine items in the text that map to proper entities such as but not limited to people, money, places, dates, times, particular phrases or keywords from the parsed text or tokens. At 608, an intent prediction service can be called to determine the intent in the task request 130. In an example, third party services such as MICROSOFT Language Understanding (LUIS) and/or CRF mapping can be employed for intent prediction. In an example, a list with possible intents can be produced with the corresponding scores and an intent can be automatically or manually determined at 608 as the intent corresponding to the task request 130. Based on the intent, a pipeline is selected at 610 and the selected pipeline is employed for the automatic execution of the task at 612. In an example, automatic execution of the task can involve producing a prediction with the input data received in the task request 130.

Figure 7A:
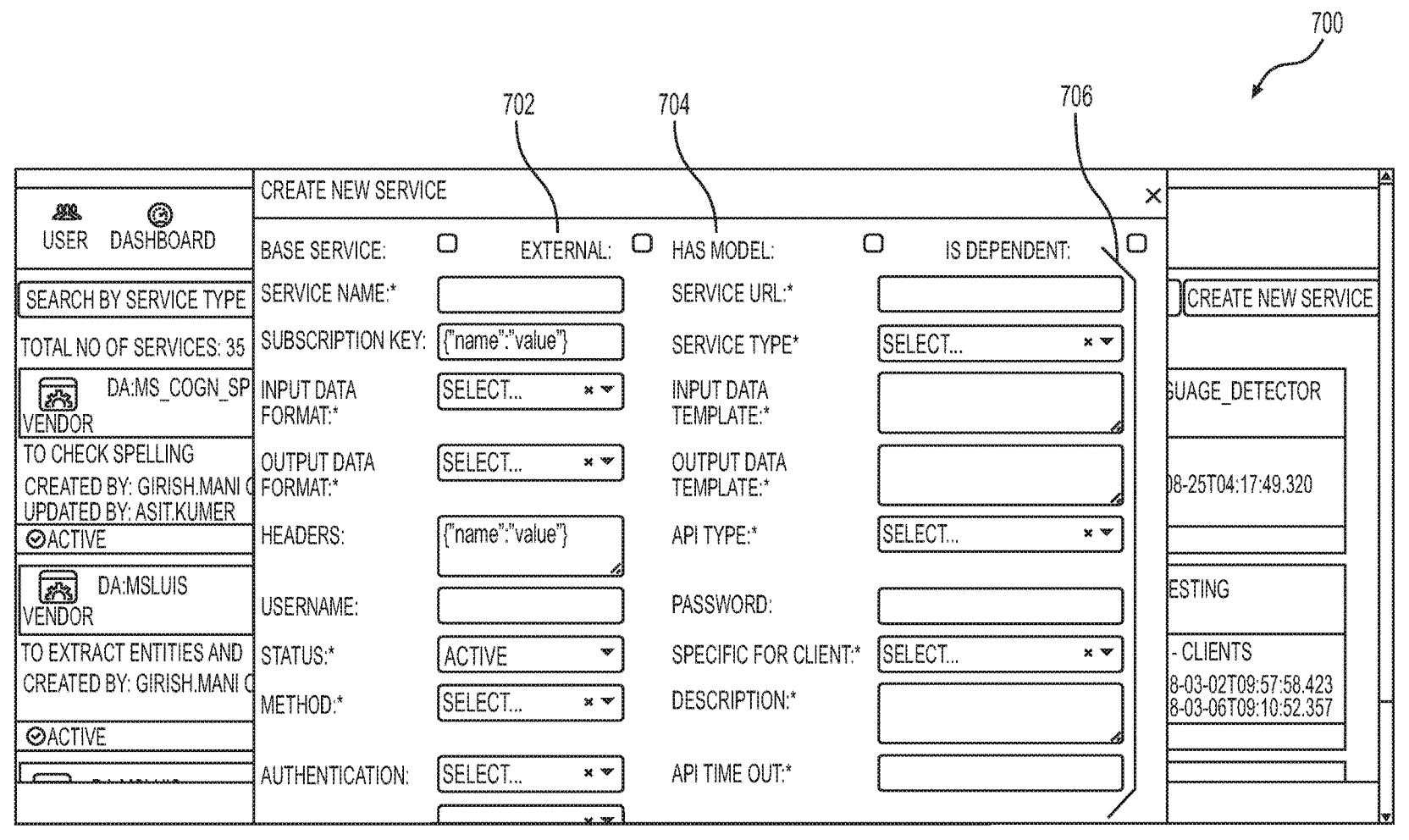

FIG. 7A shows a new service user interface (UI) 700 that enables creating a new service on the virtual automated assistance system 100 in accordance with some examples. Checking external option 702 indicates that the service is obtained from an external third party provider. For example, when using services like LUIS, the external option 702 can be selected. The next option is the model option 704 which is clicked when a ML model for generating the service is predetermined. When the model option 704 is selected, the user will be required to enter the details of the model. Various attributes of the service such as but not limited to the service name, input and output data formats, the service URL that can be used for accessing the service, the service type, the client or task owner id and the like are entered using the various UI elements in the service details area 706. Some services such as external services can require user authentication which necessitates the user to provide the user name and password details and the like.

Figure 7B:
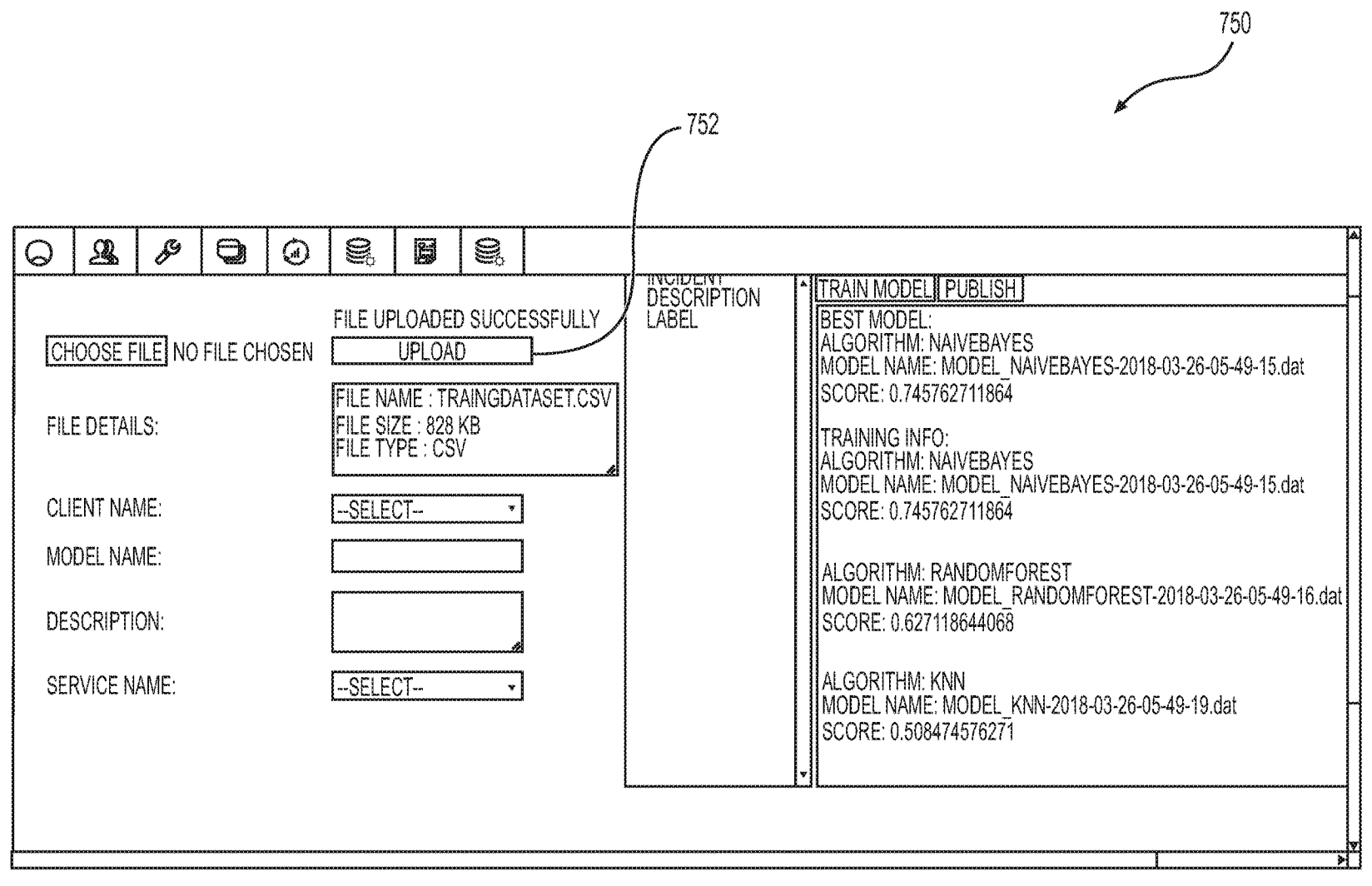

FIG. 7B shows a user interface 750 that displays scores obtained by the various trained ML models or algorithms during the generation of a service on the virtual automated assistance system 100 in accordance with examples described herein. The various ML models are trained on test data that is uploaded using the upload button 752. Among the different ML models such as naïve bayes, random forest, KNN and other models that were trained, the naïve bayes model has the highest score of 0.745 wherein a score of 1 is a perfect score. The naïve bayes model is therefore selected for the generation of the service.

Figure 8:
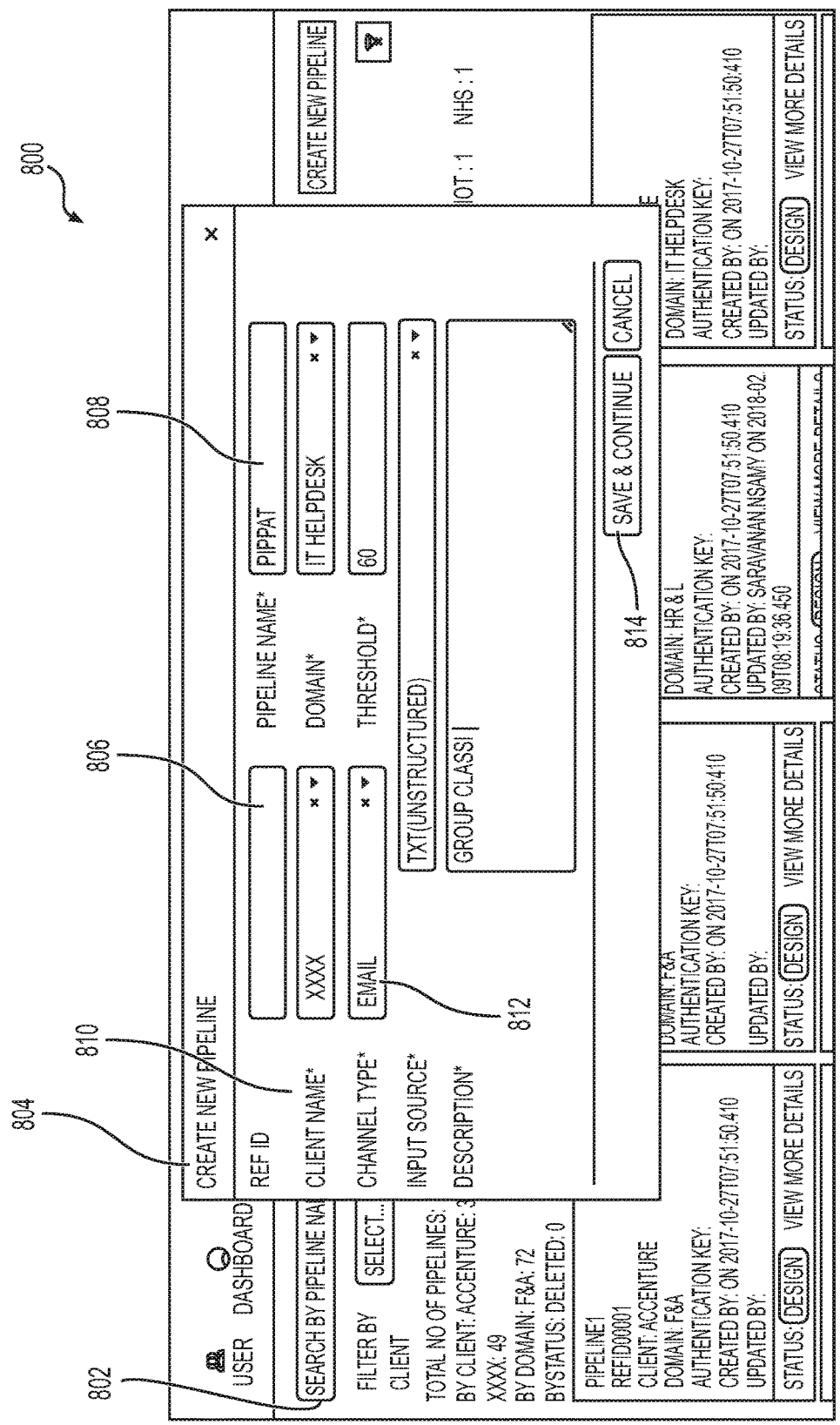
FIG. 8 shows a new pipeline UI that enables generating a new pipeline on the AI-based virtual automated assistance system in accordance with examples disclosed herein.

FIG. 8 shows a new pipeline UI 800 that enables generating a new pipeline on the virtual automated assistance system 100 in accordance with examples disclosed herein. The new pipeline UI 800 can be accessed via an interface 802 that lists the existing pipelines for the task owner. The create new pipeline dialog box 804 includes UI elements to receive a unique id 806 for the pipeline which can be used to access the pipeline by the various channels, a pipeline name 808, a client name 810, a channel type 812 which specifies the type of channel that provides input or task requests to the pipeline. Upon entering the details of the new pipeline, the user can click the save and continue 814 button in order to generate the new pipeline.

Figure 9:
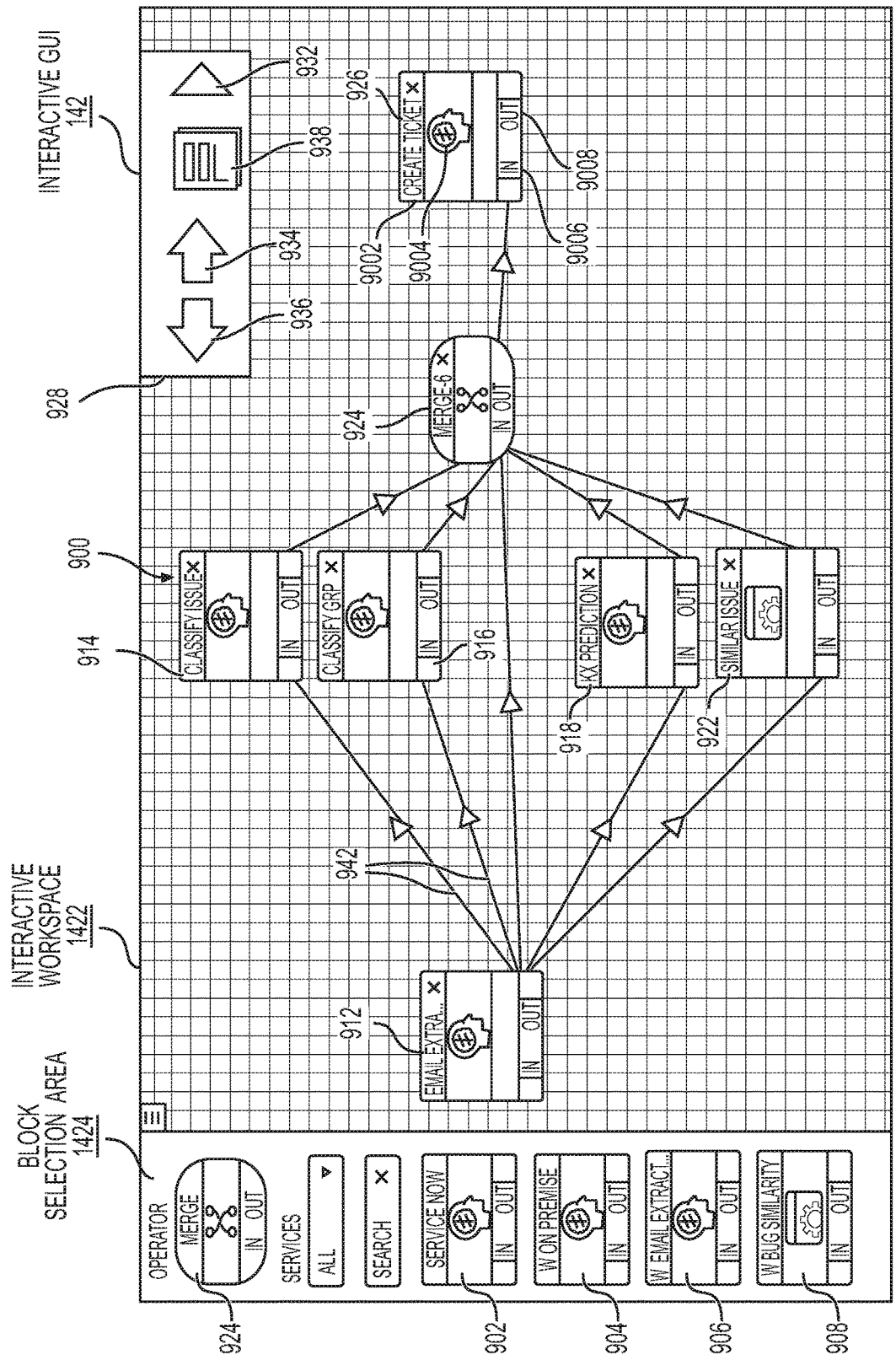
FIG. 9 shows an example of the interactive GUI associated with the pipeline studio that can be used to generate services and pipelines in accordance with examples disclosed herein.

FIG. 9 shows an example of the interactive GUI 142 associated with the pipeline studio 102 that can be used to generate services and pipelines in accordance with examples disclosed herein. The pipeline studio 102 provides for an interactive, visual workspace to easily build, test, and iterate on a predictive analysis model. The user can drag-and-drop datasets and analysis modules represented by the process blocks 902, 904 etc. onto an interactive canvas such as the interactive workspace 1424, connecting them together to form an experiment, which is run in the pipeline studio 102. To iterate on the model design, the experiment can be edited, and if desired a copy can be saved, in order to be run again. When the pipeline is ready, the training experiment can be converted to a predictive experiment, and then published as a web service on the virtual automated assistance system 100 so that the predictive model can be accessed by other users of the virtual automated assistance system 100.

The interactive GUI 142 includes the block selection area 1422 and the interactive workspace 1424. The block selection area 1422 shows or displays a few examples of user selectable process blocks 902, 904, 906 and 908 which represent various services on the virtual automated assistance system 100. Each of the process blocks includes a title 9002 that is indicative of a function of the process block, an icon 9004 which is indicative of the type of process block and the in and out ports 9006, 9008 respectively for receiving data to and outputting the data from the component process being represented by the process block. Various types of process blocks are made available on the virtual automated assistance system 100 such as but not limited to process blocks representing services that automate one or more component processes, operational process blocks that carry out specific operations and the like.

Different combinations of the process blocks 902, 904, 906 and 908 can be used to construct various pipelines. In addition, operational blocks such as the merge operator 924 can also be included in the block selection area 1422 which enable carrying out certain operations such as a 'merge' operation for various outputs from the different blocks. The merge operation can be defined within the programming of the pipeline studio 102 as, for example, one or more of a logical merge or a mathematical operation. As shown in FIG. 9, the process blocks from the block selection area 1422 are dragged and dropped on to the interactive workspace 1424 by the user in order to generate a pipeline. By the way of illustration and not limitation, generation of a pipeline to extract information from an email and make a prediction that enables creating a ticket is illustrated. The pipeline 900 includes a process block 912 to extract information from an email, a process block 914 to classify the issue, a process block 916 to classify the issue with a group that handles the issue, process blocks 918 and 922 to provide a prediction and handle similar issues 922. The process blocks are connected in an orderly manner wherein the inputs and the outputs of the process blocks are connected via the connectors 942.

The various outputs from the process blocks 914-922 are combined using the merge block 924 and the output from the merge block 924 is provided to the input of a create ticket block 926 which generates a ticket pertaining to the email or the task request. The interactive GUI 142 also includes a control panel 928 which includes a play button 932, a forward button 934, a backward button 936 and a save button 938. Of course, more or less buttons can be included in the control panel 928. The play button 932 enables automatic execution of the task represented by the pipeline 900 during the testing or the experimentation phase. The save button 938 enables saving the pipeline 900 to handle future requests by automatically generating tickets.

It can be appreciated that the visual features of the interactive GUI 142 and the elements of the interactive GUI 142 are described herein solely by the way of illustration and are not limiting and that more or less number of elements may be included within the interactive GUI 142 in accordance with examples disclosed herein.

Figure 10:
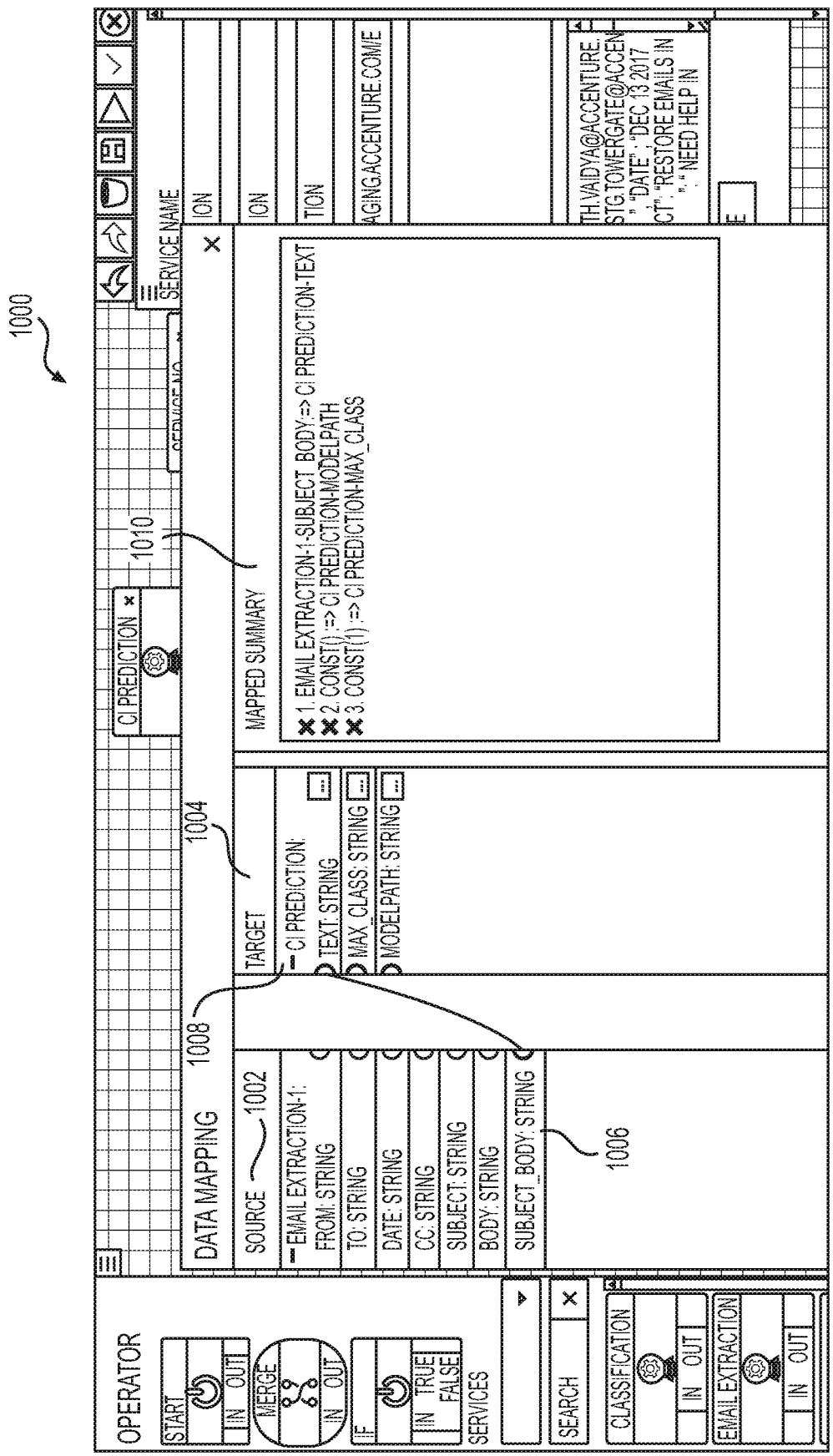
FIG. 10 shows a mapping UI that enables mapping the input(s) and output(s) of process blocks in accordance with examples disclosed herein.

In various examples, the virtual automated assistance system 100 can be employed as a tool for ML cognitive application development and runtime to enable realization of cognitive use cases easier and to provide common setup up of cognitive ML service. FIG. 10 shows a mapping UI 1000 that enables mapping the input(s) and output(s) of process blocks in accordance with examples disclosed herein. In an example, the mapping UI 1000 can be accessed, for example, via clicking on the connectors 942 or via clicking on the inputs and outputs of the process blocks. With reference to the blocks shown in FIG. 9, the output of a source block 1002 such as the email extraction block 912 is mapped to the input of a target block 1004 such as the prediction block 918. The outputs of the email extraction block 912 can include data extracted from an email such as but not limited to the 'From' string, the 'To' string, the 'Date' string, the 'cc' string, the 'Subject' string, the 'body' string and the 'Subject_body' string 1006. The Subject_body string 1006 is connected to a prediction text 1008 input of the prediction block 918. A mapped summary 1010 shows the details of output fields of the source block that are mapped to the inputs of the target block.

FIG. 11A shows a use case scenario wherein an email request 1100 is received in accordance with examples disclosed herein. The email request 1100 pertains to booking a room in New Delhi for 29-June and 30-June for a budget of $200.00.

Figure 11B:
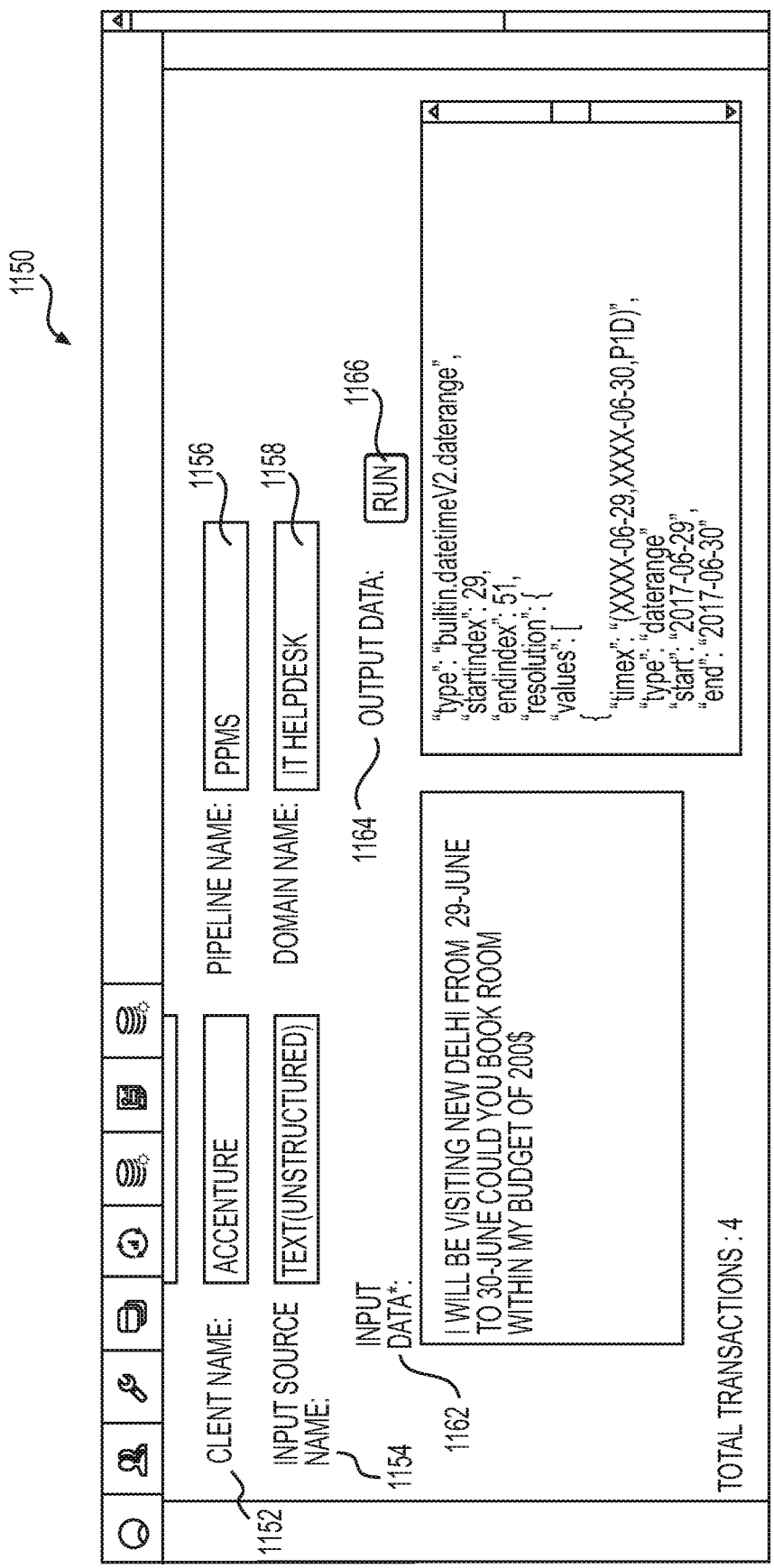

FIG. 11B shows a user interface 1150 shows the information extracted from the email request 1100. The client name 1152, input source name 1154, pipeline name 1156 and a domain name 1158 are shown. The input data 1162 includes the body of the email request 1100 while the output data 1164 includes name-value pairs of various attributes automatically extracted from the email request 1100. The user can activate the run button 1166 to automatically execute the task of booking a room using the pipeline specified by the pipeline name 1156 during the testing or experimentation phase. Subsequent email requests for a hotel reservation to the pipeline identified by the pipeline name 1156 are automatically processed and the hotel reservation request is generated and room booked per the specifications in the email in accordance with examples. In an example, the output data 1164 can be transmitted to an external system such as a hotel reservation application to book a room at the specified dates within the specified budget. Further error processing routines or exception handling in case of unavailability of the rooms and the like can either be handled by the use of the appropriate services on the virtual automated assistance system 100 or by the external hotel reservation system. In an example, the pipeline can handle all the required tasks thereby mitigating the need for the external systems.

Figure 12:
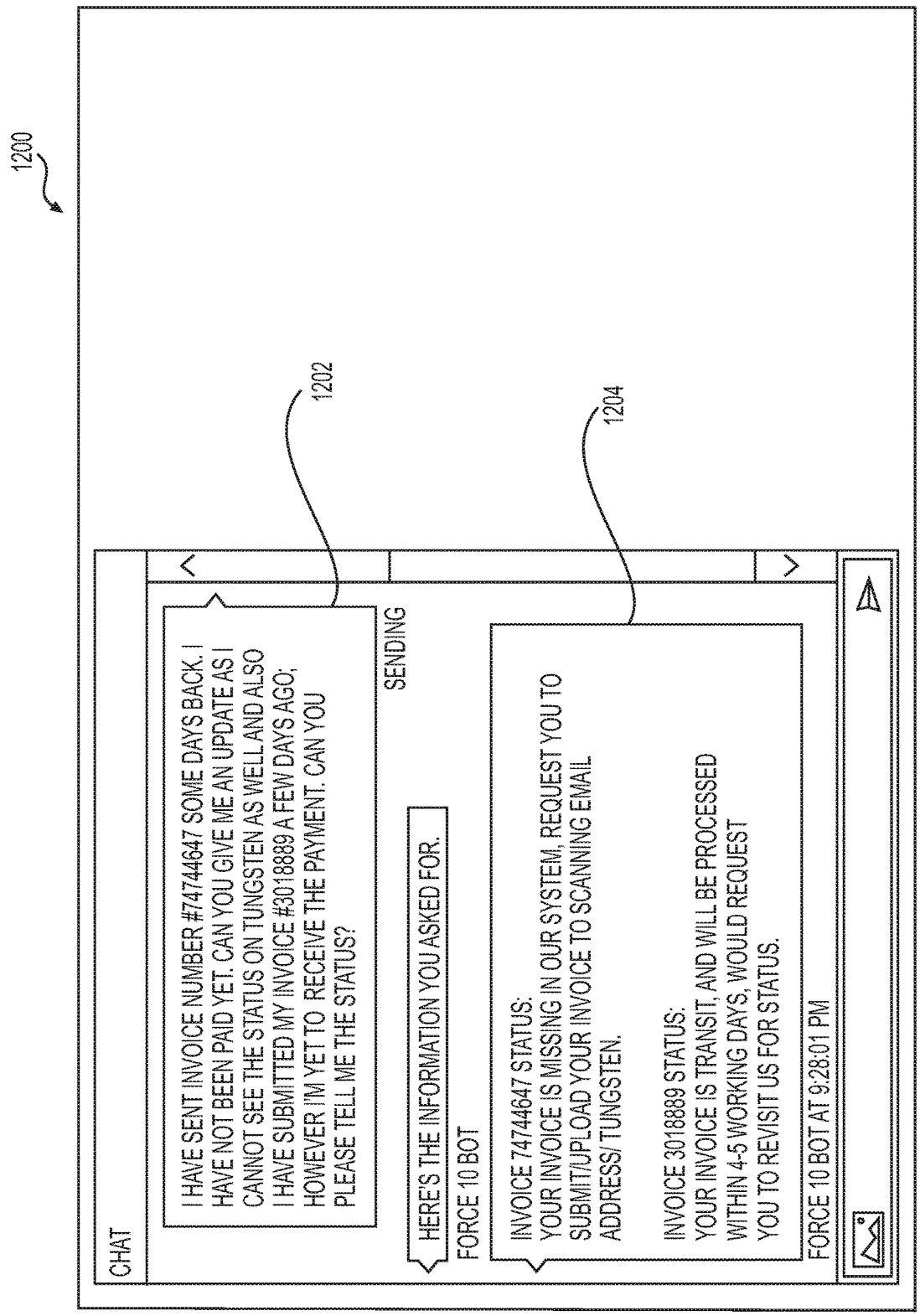
FIG. 12 shows a chat-based UI that receives a task request in accordance with examples disclosed herein.

FIG. 12 shows a chat-based UI 1200 that receives a task request 1202 in accordance with examples disclosed herein. The task request 1202 pertains to an enquiry regarding two invoice numbers that are included in the task request 1202. When processed by the corresponding pipeline, the invoice numbers are extracted and their status is obtained, for example, from an external bill processing system. The status obtained from the bill processing system is provided as the response 1204 to the requestor.

Figure 13:
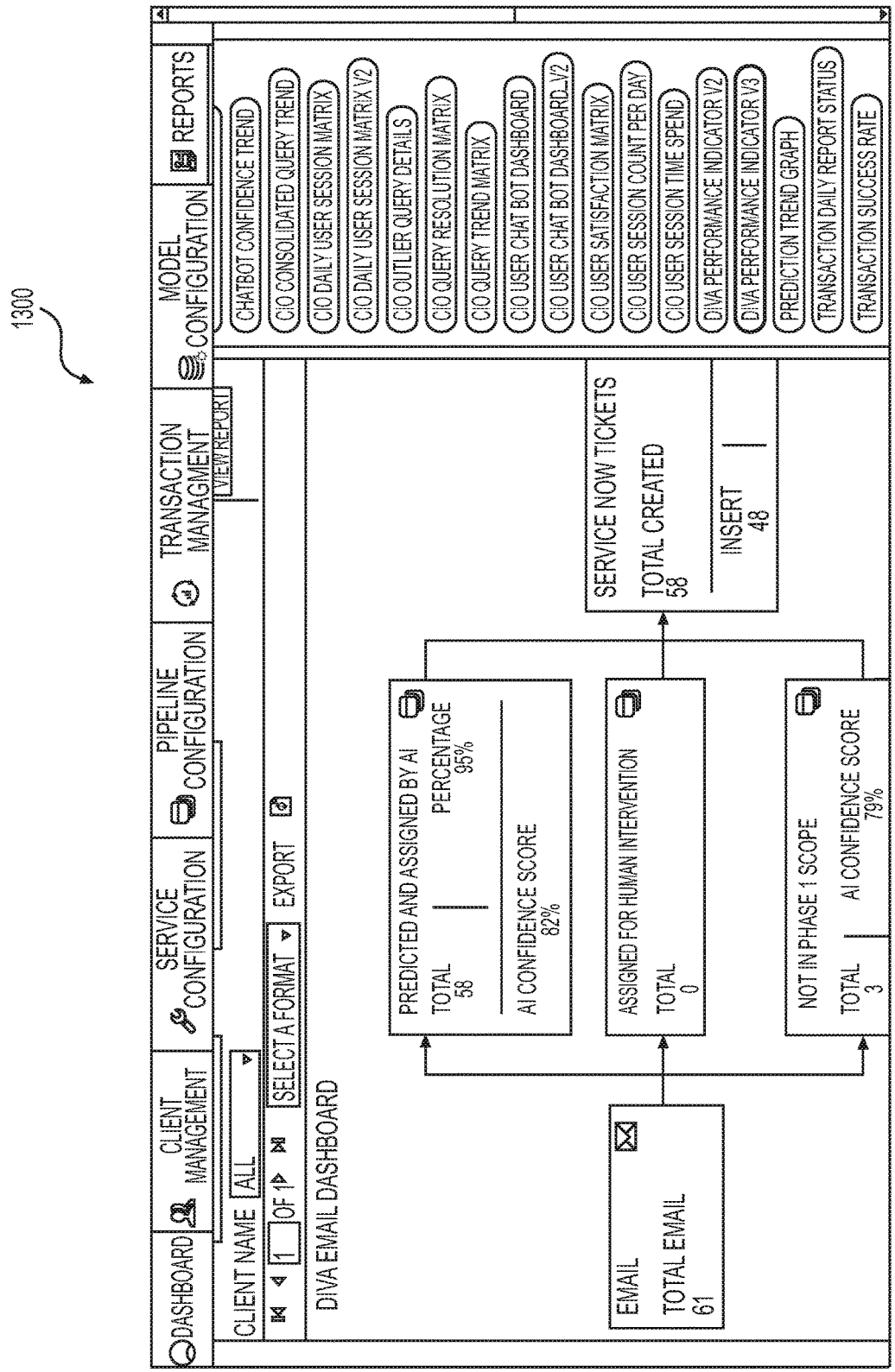
FIG. 13 shows a report generated in accordance with examples disclosed herein.

FIG. 13 shows a report 1300 generated by the report generator 182 included in the performance monitor 108 in accordance with examples disclosed herein. The report 1300 pertains to the efficiency of the email channel in handling the requests received via emails by a pipeline associated with tickets. The report conveys that the virtual automated assistance system 100 received a total of 61 emails of which 58 emails were predicted and assigned by the AI or automatically executed by a corresponding pipeline on the virtual automated assistance system 100. Accordingly, a total number of 58 'service now' tickets were created. The overall confidence score is 82% and none of the emails were assigned for human intervention which implies that the pipeline was able to handle all the requests automatically without the need for user input. Similar reports can be generated and viewed for each of the pipelines in accordance with the examples disclosed herein.

Figure 14:
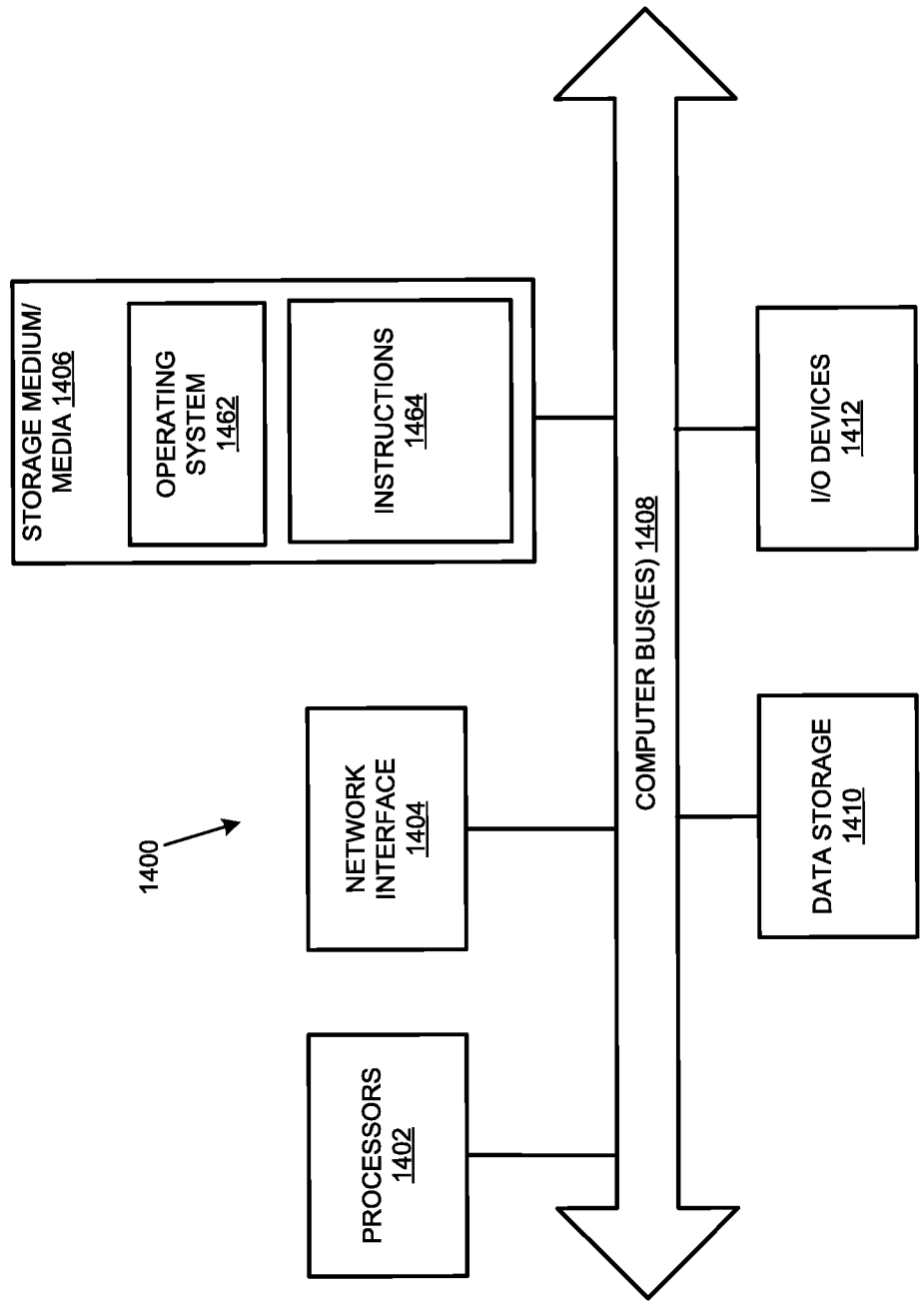
FIG. 14 illustrates a computer system that can be used to implement the AI-based virtual automated assistance system in accordance with examples disclosed herein.

FIG. 14 illustrates a computer system 1400 that may be used to implement the virtual automated assistance system 100. More particularly, computing machines such as desktops, laptops, smartphones, tablets and wearables which may be used to generate or access the data from the virtual automated assistance system 100 may have the structure of the computer system 1400. The computer system 1400 may include additional components not shown and that some of the components described may be removed and/or modified. In another example, a computer system 1400 can sit on external-cloud platforms such as, Amazon Web Services, or internal corporate cloud computing clusters, or organizational computing resources, etc.

The computer system 1400 includes processor(s) 1402, such as a central processing unit, ASIC or other type of processing circuit, input/output devices 1412, such as a display, mouse keyboard, etc., a network interface 1404, such as a Local Area Network (LAN), a wireless 802.11x LAN, a 3G or 4G mobile WAN or a WiMax WAN, and a computer-readable medium 1406. Each of these components may be operatively coupled to a bus 1408. The computer-readable medium 1406 may be any suitable medium which participates in providing instructions to the processor(s) 1402 for execution. For example, the computer-readable medium 1406 may be non-transitory or non-volatile medium, such as a magnetic disk or solid-state non-volatile memory or volatile medium such as RAM. The instructions or modules stored on the computer-readable medium 1406 may include machine-readable instructions 1464 executed by the processor(s) 1402 to perform the methods and functions of the virtual automated assistance system 100.

The virtual automated assistance system 100 may be implemented as software stored on a non-transitory computer-readable medium and executed by the one or more processors 1402. For example, the computer-readable medium 1406 may store an operating system 1462, such as MAC OS, MS WINDOWS, UNIX, or LINUX, and code 1464 for the virtual automated assistance system 100. The operating system 1462 may be multi-user, multiprocessing, multitasking, multithreading, real-time and the like. For example, during runtime, the operating system 1462 is running and the code for the virtual automated assistance system 100 is executed by the processor(s) 1402.

The computer system 1400 may include a data storage 1410, which may include non-volatile data storage. The data storage 1410 stores any data used by the virtual automated assistance system 100. The data storage 1410 may be used to store the various models that are generated, the model scores, the inputs and outputs of the various pipelines, the reports and the like.

The network interface 1404 connects the computer system 1400 to internal systems for example, via a LAN. Also, the network interface 1404 may connect the computer system 1400 to the Internet. For example, the computer system 1400 may connect to web browsers and other external applications and systems via the network interface 1404.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI) based virtual automated assistance system comprising:
   at least one processor;
   a non-transitory processor readable medium storing machine-readable instructions that cause the at least one processor to:
   receive information regarding a task to be automatically executed, the information including one or more component processes comprised in the task;
   determine if the information includes a specification of one or more machine learning (ML) models that are to be trained for automatic execution of the one or more component processes;
   for each model-specific component process of the one or more component processes wherein at least one of the ML models is specified for the automatic execution:
   register a trained ML model corresponding to the at least one specified ML model as a respective service on the automated assistance system for the automatic execution of the model-specific component process;
   for each remaining component process of the one or more component processes wherein the information does not specify at least one of the ML models for the automatic execution:
   register a selected trained model from the one or more ML models as a respective service on the automated assistance system for the automatic execution of the remaining component process;
   provide, via an interactive graphical user interface (GUI), access to the respective services corresponding to the component processes;
   enable, via the interactive GUI, construction of a pipeline representative of the task, the pipeline comprising the services representing each of the component processes arranged in an order of execution of the component processes that enables the automatic execution of the task;

receive an input related to the task; and automatically execute the task based on the input.

2. The virtual automated assistance system of claim 1 wherein the instructions to register a trained ML model further comprises instructions that cause the processor to:

access historical data related to the task, the historical data including parameter values provided as input to the task and output values that are obtained upon the automatic execution of the task.

3. The virtual automated assistance system of claim 2 wherein the non-transitory processor-readable medium further comprises instructions that cause the processor to:

train each of the one or more ML models on the historical data for automatic execution of each of the remaining component processes; and score each of the one or more ML models trained on the historical data for the automatic execution of the remaining component processes.

4. The virtual automated assistance system of claim 3 wherein instructions for registering the selected trained model as a respective service further comprise instructions that cause the processor to:

display scores of each of the one or more ML models trained on the historical data; and receive user input selecting one of the one or more ML models trained on the historical data as the selected trained model.

5. The virtual automated assistance system of claim 3 wherein instructions for registering the selected trained model as a respective service further comprise instructions that cause the processor to:

automatically select a highest scoring model from the one or more ML models trained on the historical data for use as the selected trained model.

6. The virtual automated assistance system of claim 1 wherein instructions for registering the selected trained model as a respective service further comprise instructions that cause the processor to:

move the selected trained model from a trained models table to a registered models table; and provide access to the respective service on the automated assistance system via a respective universal resource locator (URL).

7. The virtual automated assistance system of claim 1 wherein the one or more component processes comprise at least one user-selectable pre-processing technique.

8. The virtual automated assistance system of claim 1 wherein the instructions for providing access to the respective services via the interactive GUI further comprises instructions that cause the processor to:

enable display of user-selectable process blocks respectively corresponding to each of the services on the interactive GUI.

9. The virtual automated assistance system of claim 8 wherein the instructions to enable construction of the pipeline further comprises instructions that cause the processor to:

receive user input related to a structure of the pipeline which includes an arrangement of the user-selectable process blocks corresponding to the services in order of execution of the component processes.

10. The virtual automated assistance system of claim 9 wherein the instructions for enabling the construction of the pipeline further comprises instructions that cause the processor to:

receive further user input connecting output of a preceding user-selectable process block to a corresponding input of a succeeding user-selectable process block in the arrangement of the user-selectable process blocks.

11. The virtual automated assistance system of claim 1 wherein the instructions for receiving the input related to the task further comprises instructions that cause the processor to:

receive the input related to the task via one of an email, a chat, a small message service and a messenger service.

12. The virtual automated assistance system of claim 1 wherein the one or more ML models include conditional random field (CRF), nave Bayes model, random forest model and K nearest neighbor (KNN) model.

13. The virtual automated assistance system of claim 1 wherein the input includes information that enables selecting the pipeline from a plurality of pipelines each of which is configured for automatic execution of a respective task.

14. The virtual automated assistance system of claim 1 wherein the task includes ticket generation and assignment and the component processes include, extracting information from the user input, categorizing the user input based on the extracted information and assigning a resource to handle one or more issues specified in the user input.

15. A processor-executable method for automatically executing tasks using machine learning (ML) models, comprising:

accessing historical data related to a task including one or more component processes;

training the ML models on the historical data for automatic execution of the component processes;

determining if the task has an associated specification specifying one or more of the ML models for automatic execution of the component processes;

for each model-specific component process of the component processes wherein at least one of the one or more ML models is specified for the automatic execution:

registering a trained ML model corresponding to the at least one specified ML model as a respective service on an automated assistance system for the automatic execution of the model-specific component process;

for each remaining component process of the component processes wherein the information does not specify at least one of the one or more ML models for the automatic execution:

registering a selected trained model from the one or more ML models as a respective service on the automated assistance system for the automatic execution of the remaining component process;

publishing the registered ML models as services with respective universal resource locators (URLs);

providing access to the services via the URLs, the services being represented as respective process blocks on an interactive graphical user interface (GUI);

receiving user input constructing a pipeline representative of the task, the user input causing a selection and arrangement of the process blocks on an interactive workspace of the interactive GUI, the arrangement including connecting inputs of each process block to an output of a preceding process block and the output of the process block to an input of a succeeding block;

receiving a task-related user input for automatic execution of the task;

extracting information related to the task from the task-related user input, the extracted information including an owner and a domain associated with the task;

identifying from a plurality of pipelines associated with the owner and the domain, the pipeline for the automatic execution of the task, the pipeline including the services respectively corresponding to the component processes;

supplying the extracted information for the automatic execution of the task by the pipeline; and communicating an output of the automatic execution of the task to a user.

16. The method of claim 15, wherein accessing the historical data further comprises:

accessing the historical data including prior parameter values provided as inputs to the task and output values that were obtained from prior task executions.

17. The method of claim 15, wherein receiving user input constructing the pipeline, further comprises:

receiving the user input via drag-and-drop operations that drag the process blocks from a block selection area of the interactive GUI and drops the process blocks onto the interactive workspace.

18. The method of claim 15, wherein receiving a task related input further comprises:

receiving textual content in the task related input via one of an email, a chat message and a small message service (SMS) message wherein the textual content is in a non-English language and at least one of the one or more processes includes an automatic translation from the non-English language to English.

19. A non-transitory computer-readable storage medium comprising machine-readable instructions that cause a processor to:

receive information regarding a task to be automatically executed, the information including one or more component processes comprised in the task;

determine if the information includes a specification of one or more machine learning (ML) models that are to be trained for automatic execution of the one or more component processes;

for each model-specific component process of the one or more component processes wherein at least one of the ML models is specified for the automatic execution:

register a trained ML model corresponding to the at least one ML model as a respective service that enables the automatic execution of the model-specific component process;

for each remaining component process of the one or more component processes wherein the information does not specify at least one of the ML models for the automatic execution:

register a selected trained model from the one or more ML models as a respective service for the automatic execution of the remaining component process;

provide, via an interactive graphical user interface (GUI), access to the respective services corresponding to the component processes;

receive, via the interactive GUI, information related to a pipeline representative of the task, the pipeline comprising the services representing each of the component processes arranged in an order of execution of the component processes that enables the automatic execution of the task;

receive an input related to the task; and automatically execute the task based on the input.

20. The non-transitory computer-readable storage medium of claim 19, wherein the instructions to receive information related to the pipeline further comprising:

receiving via the interactive GUI drag-and-drop operations that drag process blocks representing the services from a block selection area of the interactive GUI and drops the process blocks onto a workspace area of the interactive GUI.

* * * * *